United States Patent [19]

Mattila

[11] Patent Number: 4,656,510

[45] Date of Patent: Apr. 7, 1987

[54] APPARATUS FOR IDENTIFYING AND RECORDING BOTTLES AND/OR BOTTLE HAMPERS

[75] Inventor: Timo Mattila, Kausala, Finland

[73] Assignee: Halton Oy, Finland

[21] Appl. No.: 767,031

[22] Filed: Aug. 19, 1985

[30] Foreign Application Priority Data

Aug. 29, 1984 [FI] Finland ..................... 843414

[51] Int. Cl.[4] ..................... H04N 7/18

[52] U.S. Cl. ..................... 358/101; 358/107

[58] Field of Search ..................... 358/106, 107, 101; 250/223 B

[56] References Cited

U.S. PATENT DOCUMENTS

| | | | |
|---|---|---|---|
| 4,047,000 | 9/1977 | Bryant | 250/223 B |
| 4,343,553 | 8/1982 | Nakagawa | 358/101 |
| 4,344,146 | 8/1982 | Davis | 364/552 |
| 4,414,566 | 11/1983 | Peyton | 250/223 B |
| 4,472,056 | 9/1984 | Nakagawa | 358/107 |

*Primary Examiner*—Howard W. Britton

*Attorney, Agent, or Firm*—Steinberg & Raskin

[57] ABSTRACT

Apparatus for identifying and recording bottles and/or bottle hampers utilizes a light source for illuminating a target being examined, such as, for example, a bottle hamper and/or the bottles therein. A camera momentarily examines the target. A conveyor transports the target past the camera and the light source. The image produced by the camera is transmitted to a data processing unit, after it has been transformed into digital signals, for identifying the target. A recording device records the target. The camera is a semiconductor matrix camera and the light source emits a lineal light bar and the camera and the light source are so disposed in relation to the conveyor that the light emitted by the light source is reflected from the target under examination on the conveyor to the camera. As the conveyor transports the target past the point of examination, the camera delivers to the data processing unit images from several points of the target being examined and a synthetic, three-dimensional picture of the target is formed in the memory of the data processing unit for identifying the characteristic features of the target.

5 Claims, 6 Drawing Figures

APPARATUS FOR IDENTIFYING AND RECORDING BOTTLES AND/OR BOTTLE HAMPERS

BACKGROUND OF THE INVENTION

The present invention relates to apparatus for identifying and recording bottles and/or bottle hampers.

The apparatus of the invention comprises a light source for illuminating a target to be examined, such as, for example, a bottle hamper and the bottles therein. A camera examines the target momentarily and a conveyor transports the target past the camera and the light source. The image produced by the camera is transmitted to a computer or data processing unit, after being transformed into digital form, for identifying the target, and a recorder records the target.

A bottle hamper identifying device known in the prior art utilizes ultrasonic technology. However, such device is inaccurate, because only either empty or full hampers can be identified therewith. The identifying capacity of the known device is therefore rather limited. Furthermore, any device based on ultrasonic technology is sensitive to interference from noise or air currents. This type of device is also relatively slow, because the velocity of the transport means, and, consequently, also that of the bottle hamper, is limited to about 28 mm/s. In addition, apparatus based on ultrasonic technology is very expensive.

Also known in the prior art is a device utilizing a line camera for identifying individual bottles. The basis for this type of device is the momentary examination of the received bottle over a lineal target area as the bottle is moving along a conveyor and passing in front of a detector. As the bottle moves, the lineal area of examination shifts across the entire bottle, and a line image of the bottle is obtained over the whole bottle. The line image, such as, for example, a string of signals formed by electric pulses produced by the line camera, is excellent for processing the image and shape of the bottle with a view to identifying bottle shapes which are acceptable and for recording such bottles as have been accepted. However, this type of device is only suitable for examining single bottles, and cannot be utilized to identify bottle hampers, particularly how many bottles each bottle hamper contains.

SUMMARY OF THE INVENTION

The principal object of the invention is to provide apparatus for identifying and recording bottles and/or bottle hampers, which apparatus is a considerable improvement over known devices of similar purpose and which overcomes the disadvantages of such known devices.

An object of the invention is to provide apparatus for identifying and recording bottles and/or bottle hampers, which apparatus has a high identification accuracy.

Another object of the invention is to provide apparatus for identifying and recording bottles and/or bottle hampers, which apparatus permits desired camera operation thereby permitting high bottle hamper velocities.

Still another object of the invention is to provide apparatus for identifying and recording bottles and/or bottle hampers, which apparatus is not sensitive to external interference and has components which have very long service lives and are wear-free in practice.

Yet another object of the invention is to provide apparatus for identifying and recording bottles and/or bottle hampers, which apparatus may be improved in resolution by mere programming changes.

Another object of the invention is to provide apparatus for identifying and recording bottles and/or bottle hampers, which apparatus identifies full, empty and partially filled hampers with accuracy.

In order to accomplish the aforementioned objects, the apparatus of the invention utilizes a semiconductor matrix camera and a light source emitting a lineal light bar, so disposed in relation to a conveyor that the light emitted by the light source is reflected from the target under examination on the conveyor to the camera. Thus, as the conveyor moves the target past the point of examination, the camera delivers to a computer or data processing unit images from several points of the target being examined, whereby in the memory of the data processing unit a synthetic, three-dimensional picture is formed of the target for identifying characteristic features of said target.

The apparatus of the present invention has several advantages in view of the state of art. The accuracy of identification inherent in apparatus based on a semiconductor camera is high. In such apparatus, the velocity may be as desired. The camera permits the taking of 50 pictures per second, for example, whereby it is easy to achieve a bottle hamper velocity of about 150 mm per second. The apparatus based on a semiconductor camera is not sensitive to external interference. The components used in the apparatus have a very long service life and are wear-free in practice. The resolution of the apparatus may be improved by mere programming changes, if required. All hamper conditions from full to empty and partially filled may be identified by the apparatus of the invention.

BRIEF DESCRIPTION OF THE DRAWINGS

For a fuller understanding of the invention, reference is had to the following description, taken in connection with the accompanying drawings, in which.

DESCRIPTION OF PREFERRED EMBODIMENTS

Figure 4:
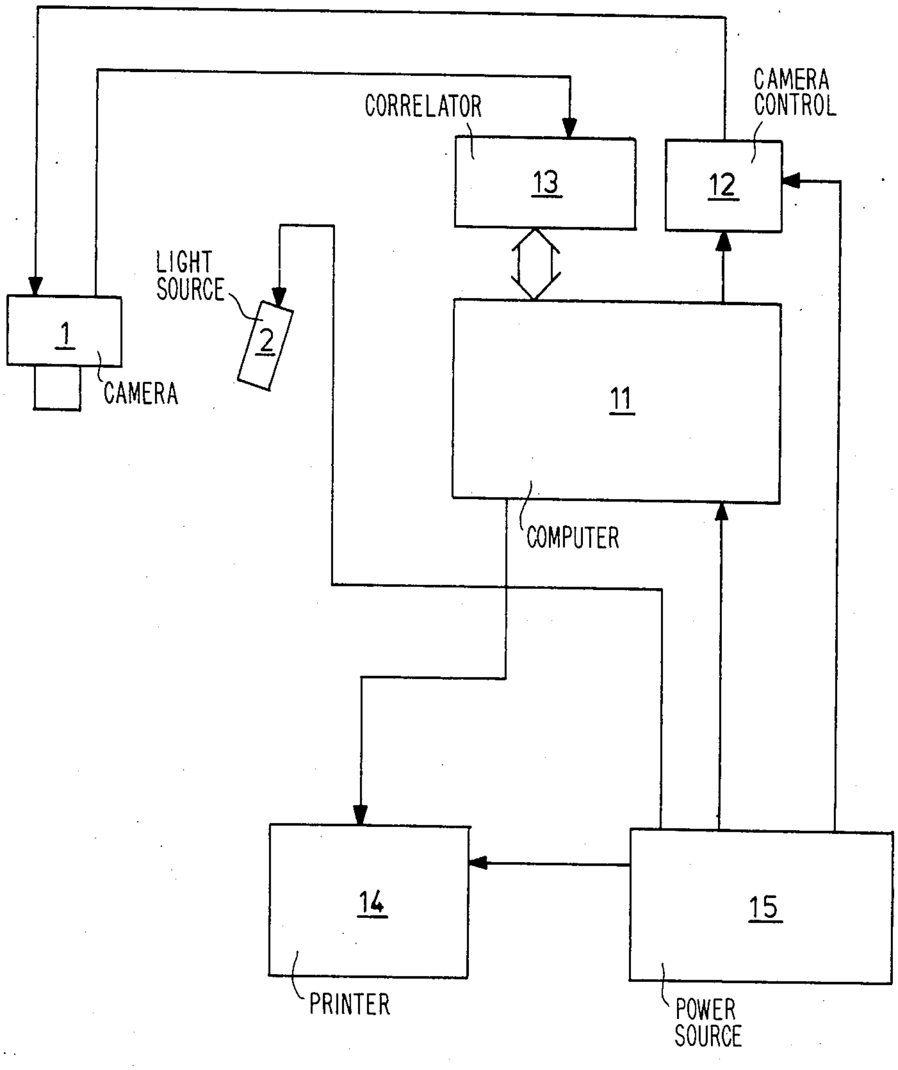
FIG. 4 is a block diagram of an embodiment of the apparatus of the invention.
Figure 5:
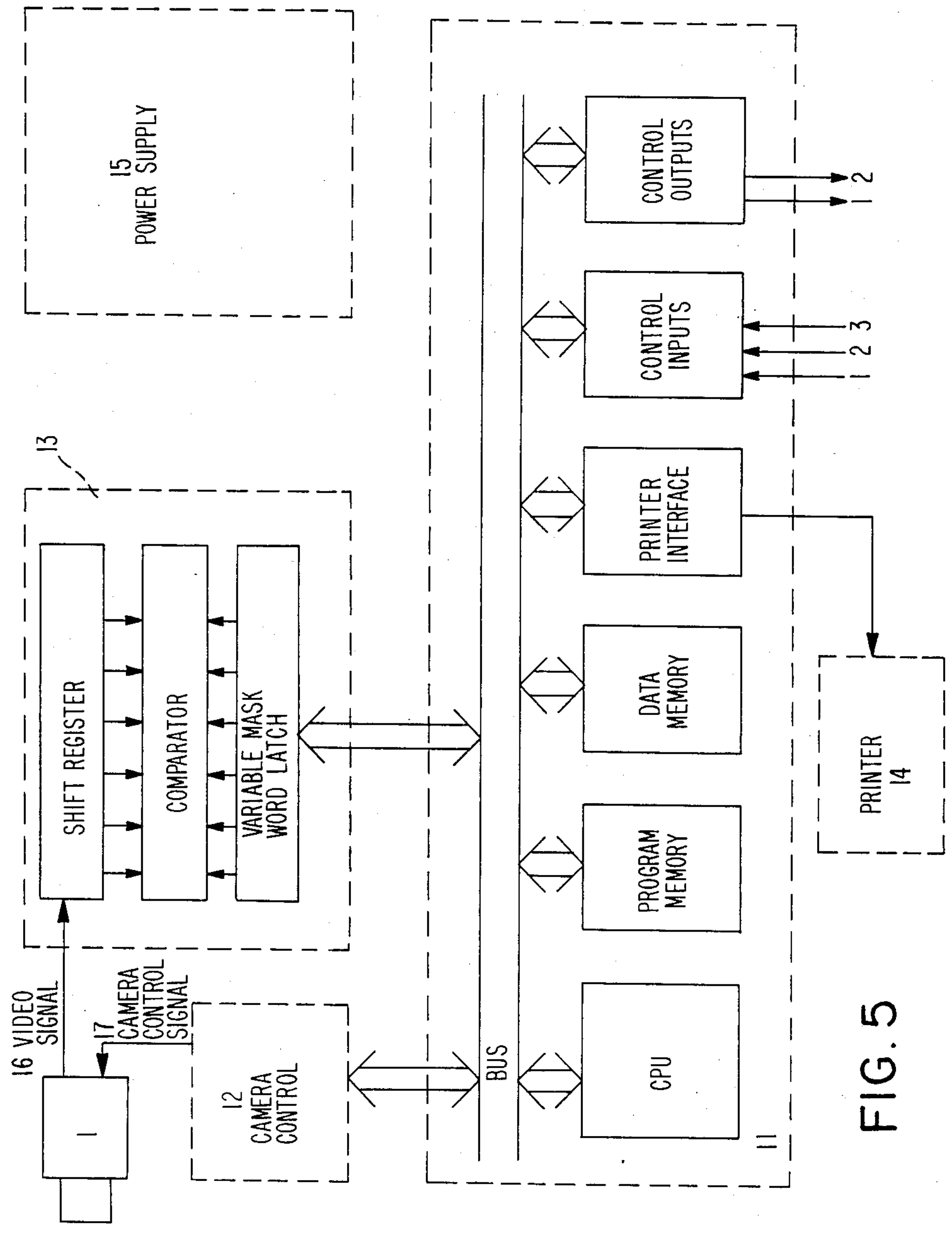
FIG. 5 shows the computer 11 and correlator 13 and the connection thereof in the diagram of FIG. 4.
Figure 6:
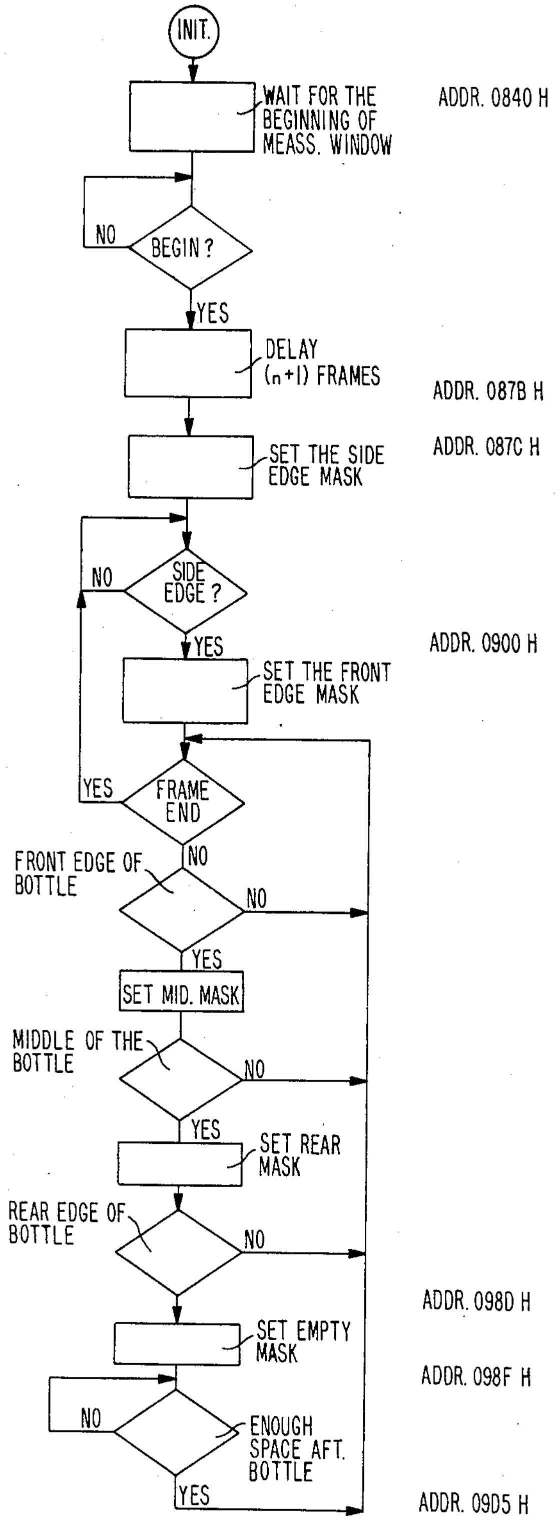
FIG. 6 shows a program diagram of the system used in the invention.

First, reference is made to FIG. 4, presenting by way of example an embodiment of the apparatus of the invention for identifying and recording bottles and/or bottle hampers. The apparatus of the invention comprises a semiconductor camera 1, which is preferably a CCD, or Charge Coupled Diode, matrix camera, or area imaging device, and a lineal light source 2. The disposition of the camera 1 and the light source 2 is such that the lineal light bar emitted by said light source can be reflected by the target to be identified to said camera.

The light is conducted through the optical system of the camera 1 to a light-sensitive camera element. An image of the illuminated target is thus produced on the camera element.

The image of the target is transformed by the camera element into electric digital signals and is transmitted through a correlator 13 to a computer or data processing unit 11. The characteristic features of the target are elicited with the aid of programmed processing for identifying the target in the computer 11. The identification data is then transmitted from the computer 11 to a recorder or printer 14, which outputs the information, for example, on a refunding voucher made out to a customer, giving the number of bottles and/or bottle hampers. The apparatus of the invention further comprises a power source 15, which provides the components of said apparatus with operating power, and a camera control 12, which controls the camera 1 on the basis of information received from the computer 11.

Figure 1:
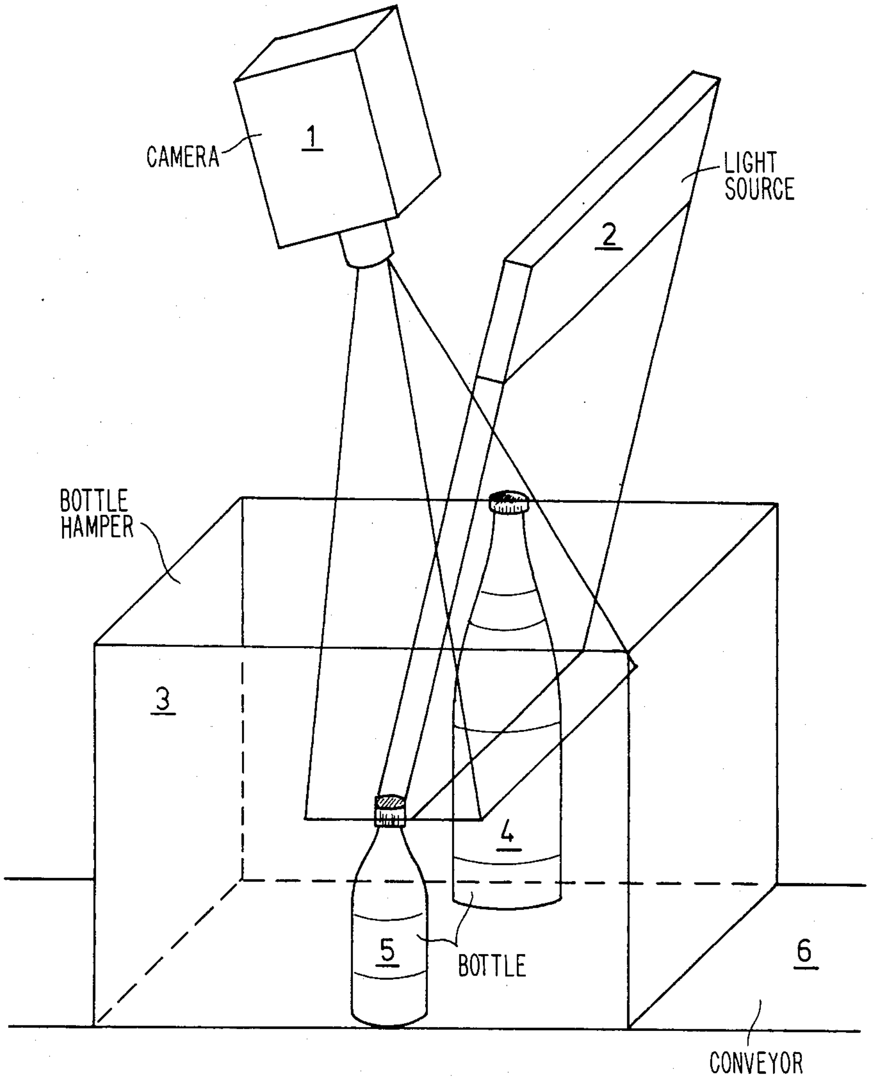
FIG. 1 is a perspective illustration of the principle of the apparatus of the invention.
Figure 2:
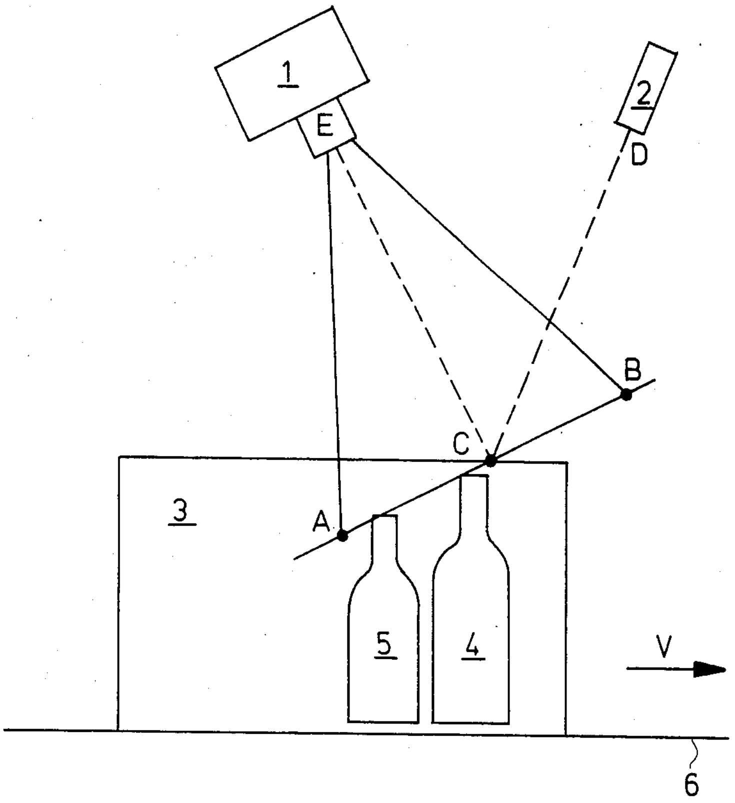
FIG. 2 is a schematic presentation, in elevational view, of the geometry of the measuring set up of the apparatus of the invention.
Figure 3:
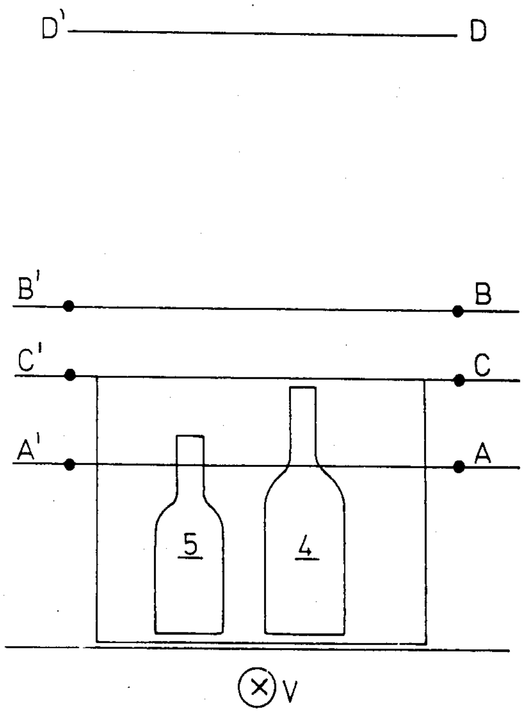
FIG. 3 is a schematic presentation, in front view, of the geometry of the measuring set up of the apparatus of the invention.

FIGS. 1 to 3 schematically present the measuring set up of the apparatus of the invention. The semiconductor camera 1 and the lineal light source 2 are disposed geometrically above the conveyor 6, so that the lineal light bar emitted by said light source is reflected from the target to be identified, such as, for example, a bottle hamper 3 and/or the bottles 4 and 5, to said camera. The camera 1 and the light source 2 may be so arranged that the vertical plane passing through the longitudinal central axis of the conveyor 6 also passes through said camera and said light source. The camera 1 and the light source 2 may also be located on opposite sides of the aforedescribed vertical plane, and other alternatives are equally conceivable.

The bottle hamper 3 and the bottles 4 and 5 travel along the conveyor 6 past the camera 1 and the light source 2. The camera 1 examines the target momentarily, taking 50 pictures per second, for example. The images are then transformed into digital signals and transmitted or supplied to the computer 11. As the conveyor 6 transports the target past the point of observation, several images of the target are received, taken of different parts of the target. The computer 11 builds in its memory storage a synthetic, three-dimensional picture of such images, in which all the characteristic features of the target can be discerned.

The generation of the three-dimensional picture is best understood through FIGS. 2 and 3. As shown in FIGS. 2 and 3, the focussing plane of the camera 1 is the plane between the points A, A′, B and B′, the view angle of the camera being AEB. The light source 2 is placed and aligned so that the projection of its light line DD′ on the focussing plane AA′–BB′ and the projection CC′ of the central axis EC-EC′ of the camera 1 on the focussing plane intersect in said focussing plane at CC′. As is observed in FIGS. 2 and 3, a sharp image of the target is produced on the plane AA′BB′. Since the camera 1 is installed so that the focussing plane AA′BB′ of said camera is inclined relative to the plane of the conveyor 6, the height of the target will determine that part of the image area in which the target is observed. As a result, a bottle 5 of lesser height is shown clearly below the line CC′ and a bottle 4, which is significantly taller, would be seen above the line CC′. The camera geometry enables observations to be made all the way down to the conveyor belt level 6; it is therefore possible to produce a picture of bottles of different heights, or of other targets, which picture assists in determining the dimensions and thus permits identification of the target.

The apparatus of the invention is particularly suitable in, for example, food stores and equivalent, where returned bottles are received in hampers. The apparatus of the invention would also be suitable in soft drink breweries, for example, where the proper filling of the soft hampers is desired to be checked.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. Apparatus for identifying and recording bottles and/or bottle hampers, a bottle hamper and the bottles therein being a target under examination, said apparatus comprising a light source emitting a lineal light line for illuminating the target;

a semiconductor matrix camera for examining said target momentarily;

a conveyor for transporting said target past said camera and said light source, said camera and said light source being so disposed in relation to said conveyor that the light emitted by said light source is reflected from said target on said conveyor to said camera;

a data processing unit having a memory;

means for transforming the image formed by said camera into digital signals and transmitting said digital signals to said data processing unit for identifying said target whereby said conveyor transports said target past a point of examination and as said target passes said point of examination, said camera delivers to said data processing unit images from several points of said target and a synthetic, three-dimensional picture of said target is formed in said memory of said data processing unit for identifying the characteristic features of said target; and recording means connected to said data processing unit for recording said characteristic features of said target.

2. Apparatus as claimed in claim 1, wherein said camera has a focussing plane, said conveyor is in a plane and said camera is disposed above said conveyor so that the focussing plane of said camera is inclined against the plane of said conveyor, whereby a sharp image of targets having different heights in different parts of said focussing plane is produced by said camera.

3. Apparatus as claimed in claim 1, wherein said camera has a central axis and said camera and said light source are so disposed that the projection of the light line of said light source and the projection of the central axis of said camera intersect in the focussing plane of said camera at a point.

4. Apparatus as claimed in claim 1, wherein said conveyor has a longitudinal central axis and said camera and said light source are disposed above said conveyor in a vertical plane passing through the longitudinal central axis of said conveyor.

5. Apparatus as claimed in claim 1, wherein said conveyor is in a plane and has a longitudinal central axis and said camera and said light source are disposed above the plane of said conveyor on opposite sides of a vertical plane passing through the longitudinal central axis of said conveyor.

* * * * *